(12) United States Patent
Forutanpour et al.

(10) Patent No.: US 8,665,214 B2
(45) Date of Patent: Mar. 4, 2014

(54) EXTENDING BATTERY LIFE OF A PORTABLE ELECTRONIC DEVICE

(75) Inventors: Babak Forutanpour, San Diego, CA (US); Homayoun Shahri, Dana Point, CA (US); Farhan M Aziz, San Diego, CA (US); Maria E Romera Jolliff, Vista, CA (US); Ronen R Stern, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 12/980,823

(22) Filed: Dec. 29, 2010

(65) Prior Publication Data

US 2012/0169608 A1 Jul. 5, 2012

(51) Int. Cl.
*G06F 3/033* (2013.01)
*G09G 5/08* (2006.01)
*G06F 1/32* (2006.01)

(52) U.S. Cl.
USPC .............. 345/158; 345/87; 345/211; 713/300

(58) Field of Classification Search
None
See application file for complete search history.

(56) References Cited

U.S. PATENT DOCUMENTS

| | | | | |
|---|---|---|---|---|
| 5,867,140 A | * | 2/1999 | Rader | 345/98 |
| 5,881,299 A | * | 3/1999 | Nomura et al. | 713/324 |
| 5,903,254 A | * | 5/1999 | Mundt et al. | 715/846 |
| 7,505,795 B1 | | 3/2009 | Lim et al. | |
| 7,769,416 B2 | | 8/2010 | Wei et al. | |
| 2002/0143489 A1 | * | 10/2002 | Orchard | 702/141 |
| 2003/0076343 A1 | * | 4/2003 | Fishkin et al. | 345/701 |
| 2003/0169247 A1 | * | 9/2003 | Kawabe et al. | 345/204 |
| 2004/0080541 A1 | * | 4/2004 | Saiga et al. | 345/805 |
| 2004/0204183 A1 | | 10/2004 | Lencevicius et al. | |
| 2006/0001402 A1 | * | 1/2006 | Kim et al. | 320/132 |
| 2006/0019723 A1 | * | 1/2006 | Vorenkamp et al. | 455/574 |

(Continued)

FOREIGN PATENT DOCUMENTS

EP 1056261 A2 11/2000
EP 2112807 A1 10/2009

(Continued)

OTHER PUBLICATIONS

Trapani, Gina "An App That Makes Android Smarter Than Ever" from FastCompany.com http://www.fastcompany.com/1693283/how-to-automate-android-with-tasker, Oct. 11, 2010, printed Oct. 18, 2010, 4 pp.

(Continued)

*Primary Examiner* — James Wozniak
*Assistant Examiner* — Antonio Xavier
(74) *Attorney, Agent, or Firm* — Campbell C. Chiang; Espartaco Diaz Hidalgo

(57) ABSTRACT

A particular method includes determining a battery charge value of a battery at a particular time and comparing the battery charge value at the particular time to a threshold battery charge value of a battery usage profile associated with the particular time, where the threshold battery charge value varies over time (e.g., a dynamic threshold). When the battery charge value does not satisfy the threshold battery charge value, the method includes prompting a user to select a power save mode. For example, the power save mode may include activating a different backlight element of a plurality of backlight elements of a display device in response to a motion sensor of a portable electronic device detecting movement of the portable electronic device from a first orientation to a second orientation.

22 Claims, 10 Drawing Sheets

(56) References Cited

U.S. PATENT DOCUMENTS

| | | |
|---|---|---|
| 2006/0221072 A1* | 10/2006 | Se et al. .................. 345/420 |
| 2006/0223443 A1* | 10/2006 | Reudink .................. 455/67.11 |
| 2007/0002018 A1* | 1/2007 | Mori ........................ 345/158 |
| 2007/0004451 A1* | 1/2007 | Anderson ................ 455/556.1 |
| 2007/0075965 A1* | 4/2007 | Huppi et al. ............. 345/156 |
| 2007/0176898 A1* | 8/2007 | Suh ........................... 345/158 |
| 2007/0176918 A1* | 8/2007 | Aho et al. ................ 345/211 |
| 2007/0296684 A1* | 12/2007 | Thomas et al. .......... 345/102 |
| 2008/0030360 A1* | 2/2008 | Griffin ..................... 340/689 |
| 2008/0140868 A1* | 6/2008 | Kalayjian et al. ......... 710/8 |
| 2008/0141126 A1* | 6/2008 | Johnson et al. .......... 715/273 |
| 2008/0252590 A1* | 10/2008 | Doi ........................... 345/102 |
| 2008/0303782 A1* | 12/2008 | Grant et al. .............. 345/156 |
| 2009/0143109 A1* | 6/2009 | Yamazaki ................ 455/566 |
| 2009/0309825 A1* | 12/2009 | Sodergren et al. ....... 345/156 |
| 2010/0020092 A1* | 1/2010 | Canu et al. ............... 345/589 |
| 2010/0079485 A1* | 4/2010 | Bentley ..................... 345/619 |
| 2010/0123436 A1 | 5/2010 | Herrod et al. |
| 2010/0171753 A1* | 7/2010 | Kwon ....................... 345/593 |
| 2010/0194683 A1* | 8/2010 | Piper et al. ............... 345/156 |
| 2011/0080348 A1* | 4/2011 | Lin et al. ................... 345/173 |
| 2011/0133687 A1* | 6/2011 | Kim et al. ................. 320/101 |
| 2012/0054672 A1* | 3/2012 | McDowell ................ 715/784 |

FOREIGN PATENT DOCUMENTS

| | | |
|---|---|---|
| EP | 2157770 A1 | 2/2010 |
| GB | 2384400 A | 7/2003 |
| WO | 2010013457 A1 | 2/2010 |

OTHER PUBLICATIONS

International Search Report and Written Opinion—PCT/US2011/066301—ISA/EPO—Jun. 18, 2012.

* cited by examiner

Warning: Your battery is at 45%, and it should be at 55% in order to run out of power by your usual charging time of 7:15. If you continue to proceed with the ONLINE POKER application, you will lose 1% of battery power for every 3.5 minutes of play. Perhaps a game that does not require the modem, such as DOODLE GAME, which provides 7 minutes of play per 1% of battery life would be better?

*FIG. 6*

EXTENDING BATTERY LIFE OF A PORTABLE ELECTRONIC DEVICE

I. FIELD

The present disclosure is generally related to extending battery life of a portable electronic device.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Today's mobile user could benefit from extending the amount of time that they are able to use a portable electronic device. Fixed battery charge level thresholds for determining whether to employ power saving techniques may provide limited capabilities with respect to extension of battery life. Further, some power saving techniques may be inconvenient for users.

III. SUMMARY

The present disclosure describes the use of power saving techniques to extend a battery life of a portable electronic device in response to input from one or more sensors. A battery usage profile may be used to determine whether such power saving techniques may reduce the likelihood of draining a battery of the portable electronic device before the portable electronic device is able to be recharged. Further, particular power saving techniques may provide a user of the portable electronic device with certain functions of the portable electronic device that may improve a user experience while extending the battery life.

In particular embodiment, a method includes activating a first backlight element of a plurality of backlight elements of a portable electronic device when the portable electronic device has a first orientation. For example, the plurality of backlight elements may include multiple light emitting diodes (LEDs) associated with a liquid crystal display (LCD). Each backlight element of the plurality of backlight elements is associated with a particular portion of a display device of the portable electronic device, and the first backlight element is associated with a first portion of the display device. As an example, when the portable electronic device has the first orientation, a first LED may be fully activated (e.g., operating at 100% of backlight capability), while the remaining LEDs may be completely deactivated (e.g., operating at 0% of backlight capability). Alternatively, some or all of the LEDs may be partially deactivated at the first orientation (e.g., operating at 10% of backlight capability). The method further includes activating a second backlight element of the plurality of backlight elements in response to a motion sensor of the portable electronic device detecting movement of the portable electronic device from the first orientation to a second orientation. The second backlight element is associated with a second portion of the display device.

In another particular embodiment, an apparatus (e.g., a portable electronic device) includes a display device and a plurality of backlight elements. Each backlight element of the plurality of backlight elements is associated with a particular portion of a display device. The portable electronic device also includes a motion sensor and logic configured to activate a first backlight element of the plurality of backlight elements when the portable electronic device has a first orientation. The first backlight element is associated with a first portion of the display device. The logic is further configured to activate a second backlight element of the plurality of backlight elements in response to the motion sensor detecting movement of the portable electronic device from the first orientation to a second orientation. The second backlight element is associated with a second portion of the display device.

In another particular embodiment, an apparatus includes means for detecting movement of a portable electronic device. The apparatus further includes means for activating a first backlight element of a plurality of backlight elements of a display device when the portable electronic device has a first orientation. Each backlight element of the plurality of backlight elements is associated with a particular portion of the display device, and the first backlight element is associated with a first portion of the display device. The apparatus further includes means for activating a second backlight element of the plurality of backlight elements of the display device in response to detection of movement of the portable electronic device from the first orientation to a second orientation. The second backlight element is associated with a second portion of the display device.

In another particular embodiment, a method includes determining a battery charge value of a battery of a portable electronic device at a particular time and comparing the battery charge value determined at the particular time to a threshold battery charge value of a battery usage profile associated with the particular time, where the threshold battery charge value varies over time (e.g., a dynamic threshold). The method includes prompting a user to select a power save mode when the battery charge value does not satisfy the threshold battery charge value.

In another particular embodiment, an apparatus includes means for determining a battery charge value of a battery of a portable electronic device at a particular time and means for comparing the battery charge value determined at the particular time to a threshold battery charge value of a battery usage profile associated with the particular time, where the threshold battery charge value varies over time. The apparatus further includes means for prompting a user to select a power save mode when the battery charge value does not satisfy the threshold battery charge value.

One particular advantage provided by at least one of the disclosed embodiments is that historical battery usage information may be used to determine whether to employ one or more power saving techniques in order to extend battery life of a portable electronic device. Further, one or more power saving techniques of the present disclosure may provide an improved user experience while extending the battery life of the portable electronic device.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 6 is a diagram of a second illustrative embodiment of a user interface associated with a system of extending battery life;

V. DETAILED DESCRIPTION

The present disclosure describes the use of sensors of a portable electronic device to extend battery life. Captured usage habits (i.e., historical usage data) may provide an improved ability to prevent the portable electronic device from exhausting a battery before a user is able to recharge the battery. For example, a profile of typical usage (e.g., a power profile) of the portable electronic device may be generated during a calibration stage. During an operation stage, the power profile generated during the calibration stage may be used to determine whether to prompt a user to select a power save mode. Further, the present disclosure describes multiple power saving techniques that may provide the user with one or more functions of the portable electronic device while extending the battery life.

Figure 1:
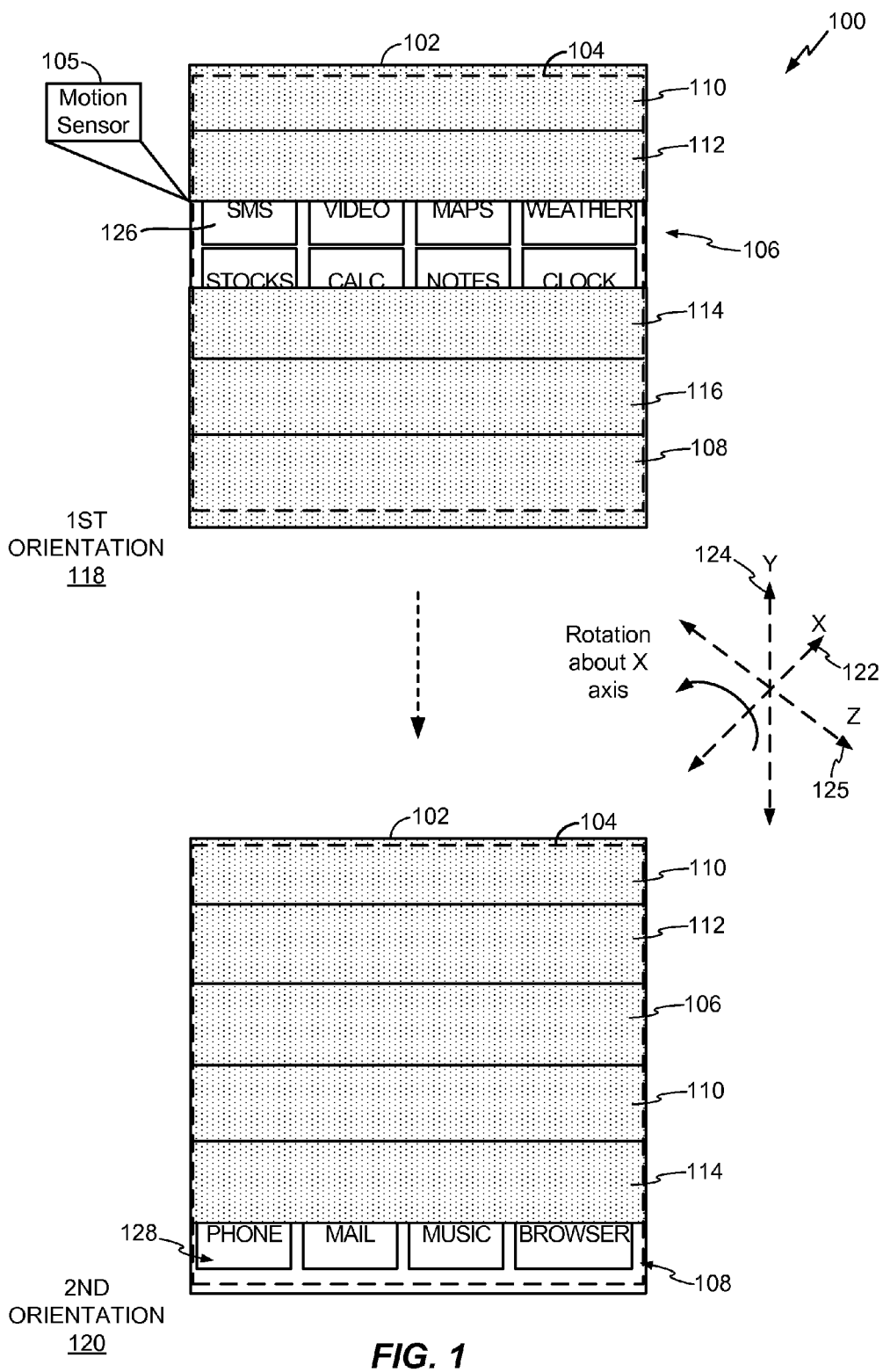
FIG. 1 is a block diagram of a first particular illustrative embodiment of a system of extending battery life.

Referring to FIG. 1, a particular illustrative embodiment of a system to extend battery life of a portable electronic device is disclosed and generally designated 100. The system 100 of FIG. 1 illustrates that one or more functions may be available to a user of a portable electronic device 102 via one or more power saving techniques. For example, in FIG. 1, a particular portion of a display device 104 (e.g., one or more horizontal backlight elements) may be visible to the user while other portions of the display device 104 are deactivated to conserve power.

Figure 2:
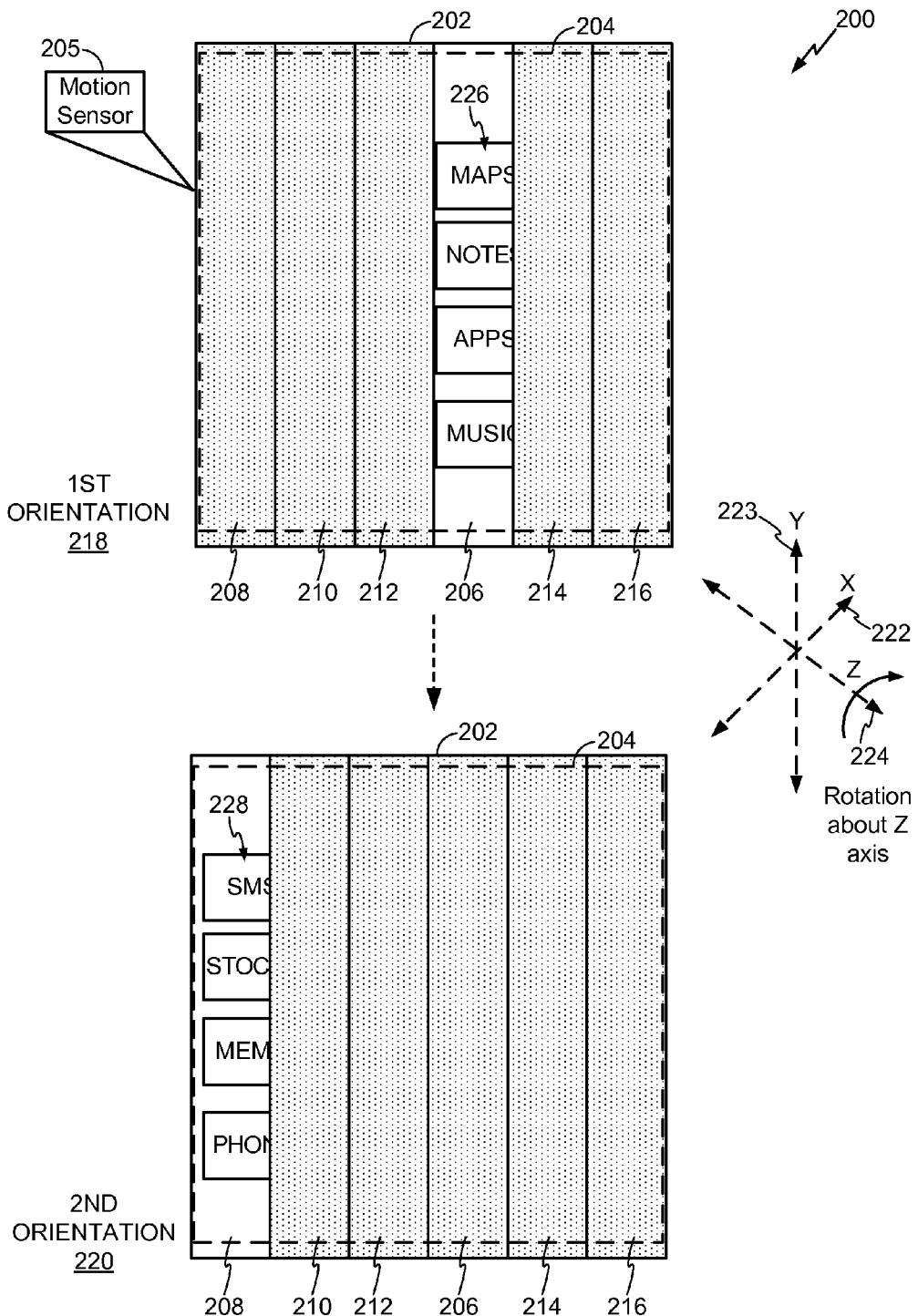
FIG. 2 is a block diagram of a second particular illustrative embodiment of a system of extending battery life.

The portable electronic device 102 of FIG. 1 includes a plurality of backlight elements associated with the display device 104. The display device 104 may be a liquid crystal display (LCD) with multiple LED backlight elements. In the embodiment illustrated in FIG. 1, the plurality of backlight elements includes a first backlight element 106, a second backlight element 108, a third backlight element 110, a fourth backlight element 112, a fifth backlight element 114, and a sixth backlight element 116. Alternatively, the display device 104 may include another number of backlight elements (i.e., at least two backlight elements). Each backlight element is associated with a particular portion of the display device 104. In the embodiment illustrated in FIG. 1, the plurality of backlight elements 106-116 are arranged horizontally. Alternatively, the plurality of backlight elements 106-116 may be arranged vertically (as illustrated in FIG. 2).

When the portable electronic device 102 has a first orientation 118, the first backlight element 106 may be activated. The term "activated," as used herein, may refer to full utilization of a backlight capability (e.g., an "on" state) or to partial utilization of the backlight capability. Further, the term "deactivated," as used herein may refer to zero utilization of a backlight capability (e.g., an "off" state) or to partial utilization of the backlight capability. In the present disclosure, a backlight element that is "activated" may provide more backlight than a "deactivated" backlight element. In an illustrative embodiment, when the portable electronic device 102 has the first orientation 118, the first backlight element 106 may be "on," while the other backlight elements (e.g., the backlight elements 108-116) may be "off." In another illustrative embodiment, the first backlight element 106 may be fully or partially activated (e.g., utilizing between 90% and 100% of backlight capability) and one or more of the other backlight elements 108-116 may be fully or partially deactivated (e.g., utilizing between 0% and 10% of backlight capability). Further, utilization of each of the "deactivated" backlight elements 108-116 may vary. As an illustrative example, in the first orientation 118, the fourth and fifth backlight elements 112, 114 may utilize 20% of backlight capability, the third backlight element 110 and the sixth backlight element 116 may utilize 10% of backlight capability, and the second backlight 108 may utilize 0% of backlight capability.

The portable electronic device 102 may also include a motion sensor 105. The motion sensor 105 performs the function of detecting movement of the portable electronic device 102. For example, the motion sensor 105 may be an accelerometer or a gyroscope. When the motion sensor 105 detects movement of the portable electronic device 102 from the first orientation 118 to a second orientation 120, the second backlight element 108 may be activated. As illustrated in FIG. 1, the second backlight element 108 is associated with a second portion of the display device 104. In the embodiment illustrated in FIG. 1, an X axis 122, a Y axis 124, and a Z axis 125 are shown, and the movement represents a first change in pitch of the portable electronic device 102 (i.e., a rotation about the X axis 122 in a first direction). Alternatively, the movement may represent any combination of pitch (i.e., rotation about the X axis 122), roll (i.e., movement about the Z axis 125), and yaw (i.e., movement about the Y axis 124) of the portable electronic device 102.

In operation, the first backlight element 106 of the plurality of backlight elements 106-116 is activated when the portable electronic device 102 has the first orientation 118. In the embodiment illustrated, a first set 126 of icons are visible as a result of the first backlight element 106 being activated. That is, the first backlight element 106 illuminates the particular portion of the display device 104 that includes the first set 126 of icons. The motion sensor 105 may detect movement (e.g., a change in pitch) of the portable electronic device 102 from the first orientation 118 to the second orientation 120. In response to detecting the movement, the second backlight element 108 may be activated. In the embodiment illustrated, a second set 128 of icons are visible as a result of the second backlight element 108 being activated. That is, the second backlight element 108 illuminates the particular portion of the display device 104 that includes the second set 128 of icons.

In the embodiment illustrated in FIG. 1, the backlight elements 108-116 are deactivated when the portable electronic device 102 has the first orientation 118. Further, the backlight elements 106 and 110-116 are deactivated when the portable electronic device 102 has the second orientation 120. In alternative embodiments, more than one backlight element may be activated at either the first orientation 118 or at the second orientation 120. For example, the first backlight element 106 and the fourth backlight element 112 may be activated when the portable electronic device 102 has the first orientation 118. As another example, the second backlight element 108 and the sixth backlight element 116 may be activated when the portable electronic device has the second orientation 120. In one embodiment, the motion sensor 105 may detect shaking of the portable electronic device 102. In this case, all of the backlight elements 106-116 may be temporarily activated in order to allow the user to view each portion of the display device 104.

Further, in the embodiment illustrated in FIG. 1, the first backlight element 106 is deactivated in response to activation of the second backlight element 108. In addition, another backlight element may be activated in response to the motion sensor 105 detecting movement of the portable electronic device 102 to a third orientation (not shown). For example, the motion sensor 105 may detect movement of the portable electronic device 102 from the second orientation 120 to the third orientation. To illustrate, the motion sensor 105 may detect movement that represents a second change in pitch of the portable electronic device 102 (e.g., a rotation about the X axis 122 in an opposite direction from the rotation from the first orientation 118 to the second orientation 120). As an illustrative example, the sixth backlight element 116 (that is associated with another portion of the display device 104) may be activated as a result of the movement. In one embodiment, the second backlight element 108 may be deactivated in response to the activation of the sixth backlight element 116.

FIG. 1 illustrates a windowing display mode (i.e., selective illumination of particular horizontal backlight elements) that may extend the battery life of the portable electronic device 102 while enabling a user to view content displayed at particular portions of the display device 104. As such, power may be conserved while the user is provided with at least a subset of the functionality of the portable electronic device 102.

Referring to FIG. 2, a particular illustrative embodiment of a system to extend battery life of a portable electronic device is disclosed and generally designated 200. The system 200 of FIG. 2 illustrates that one or more functions may be available to a user of a portable electronic device 202 via one or more power saving techniques. For example, in FIG. 2, particular portions of a display device 204 (e.g., vertical backlight elements) may be visible to a user while other portions of the display device 204 are deactivated to conserve power.

The portable electronic device 202 of FIG. 2 includes a plurality of backlight elements associated with the display device 204. For example, in the embodiment illustrated in FIG. 2, the plurality of backlight elements includes a first backlight element 206, a second backlight element 208, a third backlight element 210, a fourth backlight element 212, a fifth backlight element 214, and a sixth backlight element 216. Alternatively, the display device 204 may include another number of backlight elements (i.e., at least two backlight elements). Each backlight element is associated with a particular portion of the display device 204. In the embodiment illustrated in FIG. 2, the plurality of backlight elements 206-216 are arranged vertically.

When the portable electronic device 202 has a first orientation 218, the first backlight element 206 may be activated. The portable electronic device 202 also includes a motion sensor 205. The motion sensor 205 performs the function of detecting movement of the portable electronic device 202. For example, the motion sensor 205 may be an accelerometer, a compass, or a gyroscope. When the motion sensor 205 detects movement of the portable electronic device 202 from the first orientation 218 to a second orientation 220, the second backlight element 208 may be activated. As illustrated in FIG. 2, the second backlight element 208 is associated with a second portion of the display device 204. In the embodiment illustrated in FIG. 2, an X axis 222, a Y axis 223, and a Z axis 224 are shown, and the movement represents a first change in roll of the portable electronic device 102 (e.g., a rotation about the Z axis 224 in a clockwise direction). Alternatively, the movement may represent any combination of pitch (i.e., rotation about the X axis 222), roll (i.e., movement about the Z axis 224), and yaw (i.e., movement about the Y axis 223) of the portable electronic device 202.

In operation, the first backlight element 206 of the plurality of backlight elements 206-216 is activated when the portable electronic device 202 has the first orientation 218. In the embodiment illustrated, a first set 226 of icons are visible as a result of the first backlight element 206 being activated. That is, the first backlight element 206 illuminates the particular portion of the display device 204 that includes the first set 226 of icons. The motion sensor 205 may detect movement of the portable electronic device 202 from the first orientation 218 to the second orientation 220 (e.g., a change in roll). In response to detecting the movement, the second backlight element 208 may be activated. In the embodiment illustrated, a second set 228 of icons are visible as a result of the second backlight element 208 being activated. That is, the second backlight element 108 illuminates the particular portion of the display device 204 that includes the second set 228 of icons.

Thus, FIG. 2 illustrates that a windowing display mode (i.e., selective illumination of particular vertical backlight elements) that may extend the battery life of the portable electronic device 202 while enabling a user to view content displayed at a particular portion of the display device 204. As such, power may be conserved while the user is provided with at least a subset of the functionality of the portable electronic device 202.

Figure 3:
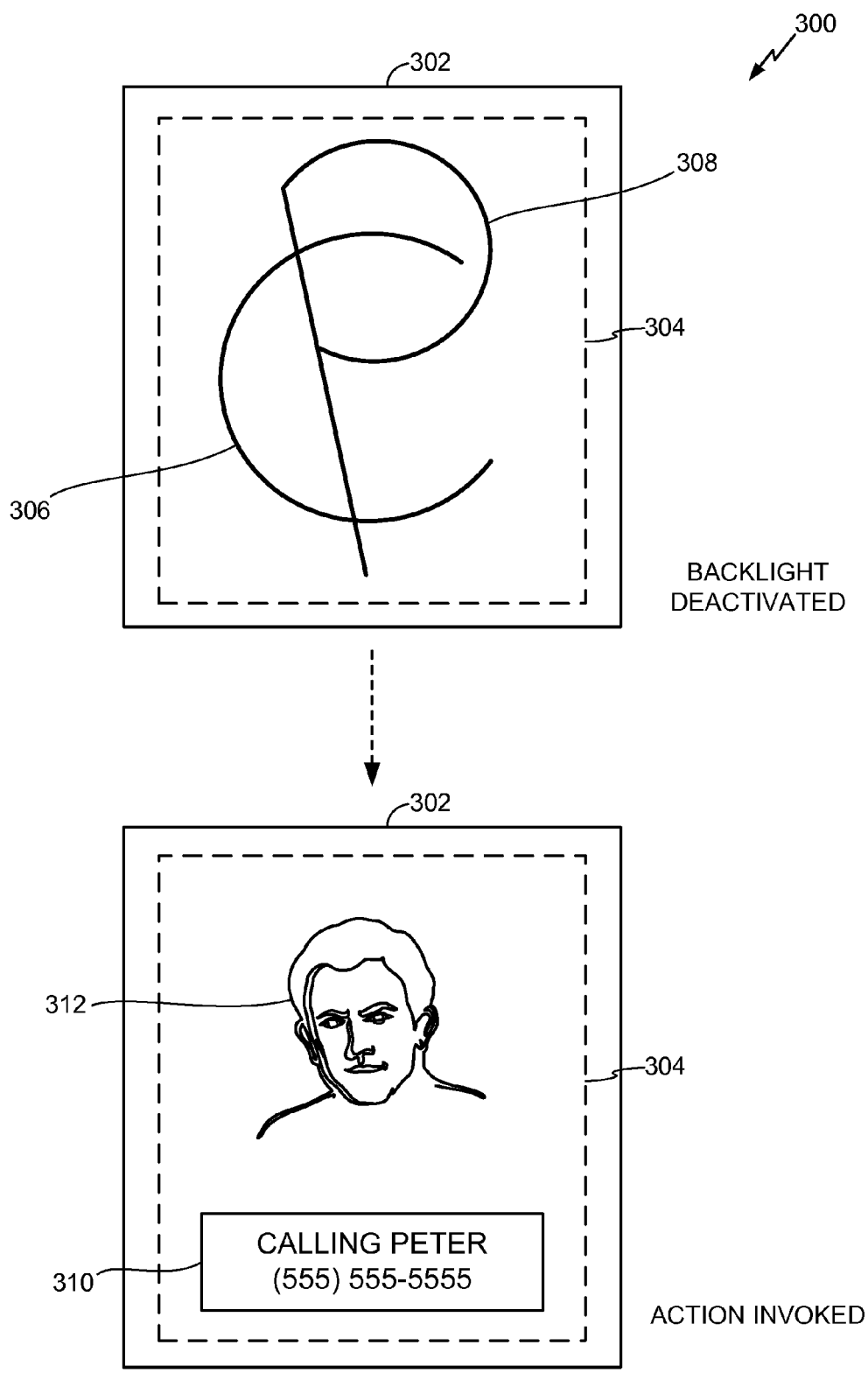
FIG. 3 is a block diagram of a third particular illustrative embodiment of a system of extending battery life.

Referring to FIG. 3, a particular illustrative embodiment of a system to extend battery life of a portable electronic device is disclosed and generally designated 300. The system 300 of FIG. 3 illustrates that one or more functions may be available to a user of a portable electronic device 302 via one or more power saving techniques. For example, in FIG. 3, illumination of a touchscreen display 304 of the portable electronic device 302 may be disabled (i.e., backlight elements are deactivated) while maintaining the ability to receive touchscreen input.

The portable electronic device 302 of FIG. 3 is configured to display content via the touchscreen display 304 and to receive touchscreen inputs from a user. Further, the portable electronic device 302 is configured to activate a power save mode, such as a touchscreen gestures mode. Prior to receiving input from the user, one or more backlight elements associated with the touchscreen display 304 may be deactivated. The touchscreen gestures mode may extend battery life by not illuminating the touchscreen display 304 in response to received touchscreen input when the touchscreen display 304 is disabled. Further, the touchscreen display 304 may remain deactivated (i.e., not illuminated) while accepting particular touchscreen inputs that invoke one or more actions.

In the embodiment illustrated in FIG. 3, a particular sequence of touchscreen inputs is associated with a particular action. For example, a first touchscreen input 306 may be associated with a motion that roughly corresponds to a character (e.g., the letter "C"). Similarly, a second touchscreen input 308 may be associated with a motion that roughly corresponds to a second character (e.g., the letter "P"). The illumination of the touchscreen display 304 may remain disabled while receiving the touchscreen inputs 306, 308. The portable electronic device 302 may be configured to invoke an action in response to the received touchscreen inputs 306, 308. For example, the sequence "CP" may be pre-configured to initiate a telephone call to "Peter" via the portable electronic device 302. Alternatively, other touchscreen inputs may be pre-configured to be associated with other actions.

In one embodiment, the action is invoked (e.g., the phone call to "Peter" is initiated) in response to the received touchscreen input without illuminating the touchscreen display 304 when the touchscreen display 304 is disabled. Alternatively, in the embodiment illustrated in FIG. 3, the particular sequence of touchscreen inputs 306, 308 may trigger illumination of the touchscreen display 304. For example, in FIG. 3, a notification 310 may be displayed that indicates that the action of initiating the telephone call has been invoked. Further, an image 312 associated with the called party (e.g., "Peter") may be displayed via the touchscreen display 304. Alternatively, a portion of the touchscreen display 304 may be illuminated. To illustrate, one or more backlight elements that illuminate the portion of the touch screen display 304 associated with the notification 310 may be activated.

Thus, FIG. 3 illustrates that a touchscreen gestures mode (e.g., deactivation of backlighting of the touchscreen display 304 while enabling a user to provide input via the touchscreen display 304) may extend the battery life of the portable electronic device 302 while enabling a user to invoke an action via one or more pre-configured touchscreen inputs. As such, power may be conserved while the user is provided with at least a subset of the functionality of the portable electronic device 302.

Figure 4:
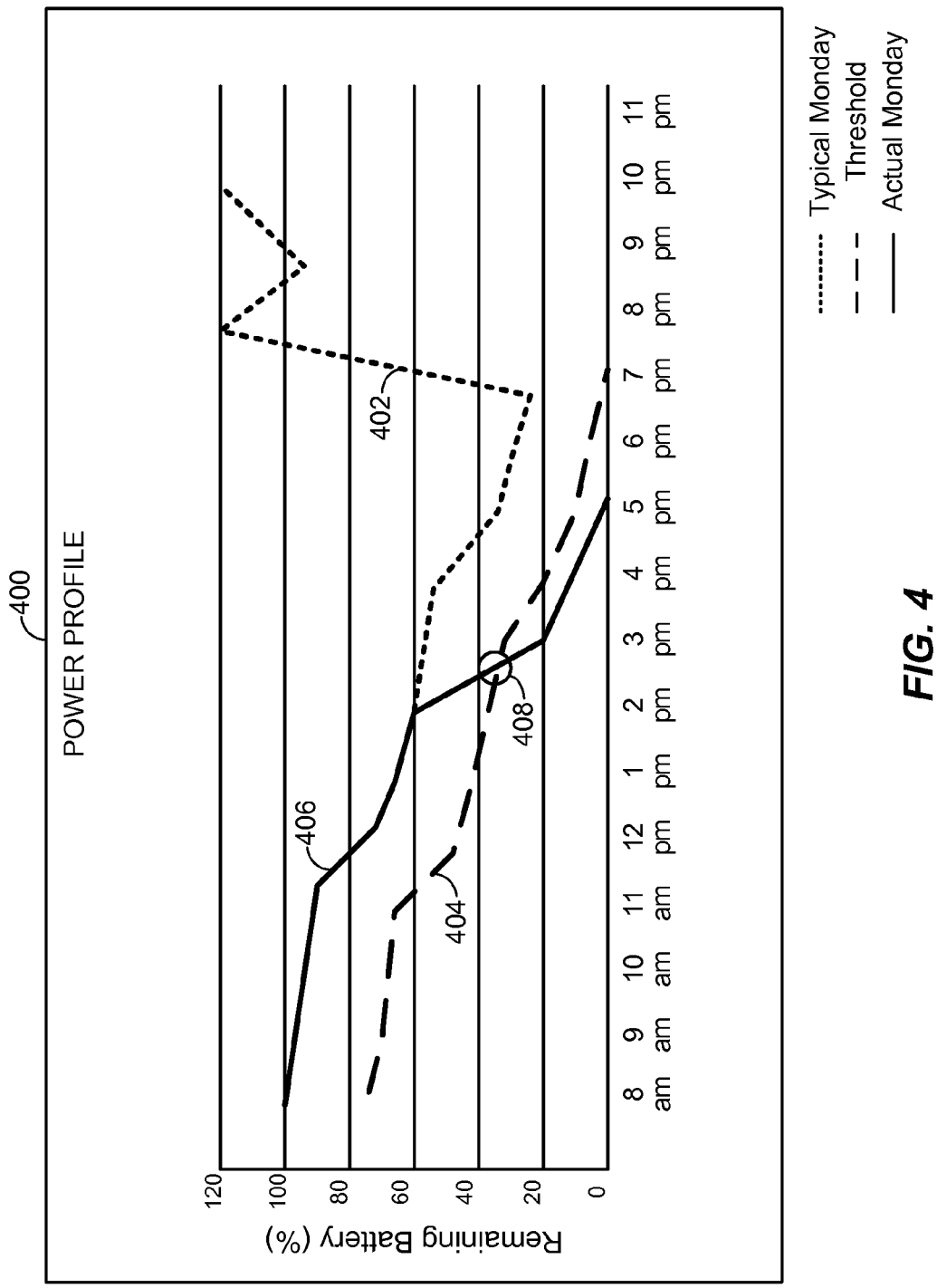
FIG. 4 is a diagram of a particular illustrative embodiment of a power profile associated with a system of extending battery life.

Referring to FIG. 4, a particular illustrative embodiment of a power profile to be used to extend the battery life of a portable electronic device is disclosed and generally designated 400. A user may be prompted to select a power save mode when a battery charge value at a particular time does not satisfy a particular battery charge threshold value that varies over time based on a historical usage profile.

The power profile 400 includes first data 402 that represents typical usage of a portable electronic device (e.g., the portable electronic devices 102, 202, and 302 of FIGS. 1-3) over a particular time period. For example, the time period in FIG. 4 may correspond to a typical weekday (e.g., Monday). Alternatively, the time period may be any other day (e.g., another weekday or a weekend day) or any other time period for which historical usage data is available. The power profile 400 also includes second data 404 that represents a threshold battery charge value and third data 406 that represents an actual battery charge value at a particular time (e.g., at a particular time on Monday). When the third data 406 indicates that the actual battery charge value at the particular time does not satisfy the threshold battery charge value (e.g., as illustrated at 408), a user may be prompted to select a power save mode. The battery charge values may represent a remaining amount of battery charge that is available to power the portable electronic device (e.g., the portable electronic devices 102, 202, and 302 of FIGS. 1-3).

A calibration stage may be used to determine the first data 402 that represents the typical usage. During the calibration stage, the user may continue to use the portable electronic device (e.g., the portable electronic devices 102, 202, and 302 of FIGS. 1-3) as she normally would. A power saver application may run in the background and log information that is useful in determining the power profile 400. For example, the power saver application may log when the portable electronic device is disconnected from a charger (e.g., at 7 a.m.), the amount of remaining battery life at particular times (e.g., N second intervals) throughout the day, and the time that the user normally charges the portable electronic device (e.g., at 7 p.m.). Further, the power saver application may capture information about power usage of each application of the portable electronic device. For example, the power saver application may attempt to generate a power profile that includes information related to applications that use various resources of the portable electronic device. To illustrate, the power saver application may generate power profile information for an online poker application (that uses a modem and other system resources), a contact manager application, or a social networking application, among other alternatives. The power saver application may collect information related to other applications that use other resources of the portable electronic device. For example, the power saver application may include information related to use of resources of the portable electronic device by a camera, a graphics intensive game, a phone, live or streaming media content, a digital music player, among other alternatives.

As an example, collection of power usage information may repeat every day until either the user terminates the calibration stage or until the data recorded by the power saver application shows an identifiable trend (e.g., the user uses the portable electronic device predominantly during lunch, while driving home, etc.). In one embodiment, the calibration stage is used to build a power profile for each day of the week, as usage may vary by day.

In operation (e.g., during an operation stage), the data obtained during the calibration stage (e.g., the power profile 400 associated with a typical Monday) may be used to determine whether the user's activities at a particular time are such that a battery may be able to provide power to the portable electronic device until the next charge. The threshold data 404 represents an allowable difference between the actual data 406 (e.g., an actual power consumption level at a particular time) and the typical data 402 (e.g., a typical power consumption level at the particular time). The threshold data 404 may be equal to the lowest battery power recorded for that particular time of day. For example, if it is 2 p.m. on Monday, and the remaining battery charge value is often 60% at this time for this day, but the device reports a remaining battery charge value of 30%, the battery may run to 0% before an expected charge. FIG. 4 illustrates that, at 408, the remaining battery charge value does not satisfy the threshold.

In another embodiment, an application may be executed in response to determining that the portable electronic device is operating when conditions indicate that the portable electronic device may be inactive. For example, the power profile 400 may indicate that the portable electronic device is inactive after 9 p.m. As another example, the conditions may include an ambient light condition, a lack of movement, presence of the portable electronic device at a particular location, a time of day, one or more statistical methods, or a combination thereof. To illustrate, a "morning newspaper" application may be used to retrieve data associated with commonly accessed items (e.g., emails, RSS feeds, web pages) and to store the data at the portable electronic device (e.g., cache the "pre-fetched" data) when the power profile 400 indicates that the portable electronic device is connected to a charger and is inactive, in order to avoid draining the battery.

Figure 5:
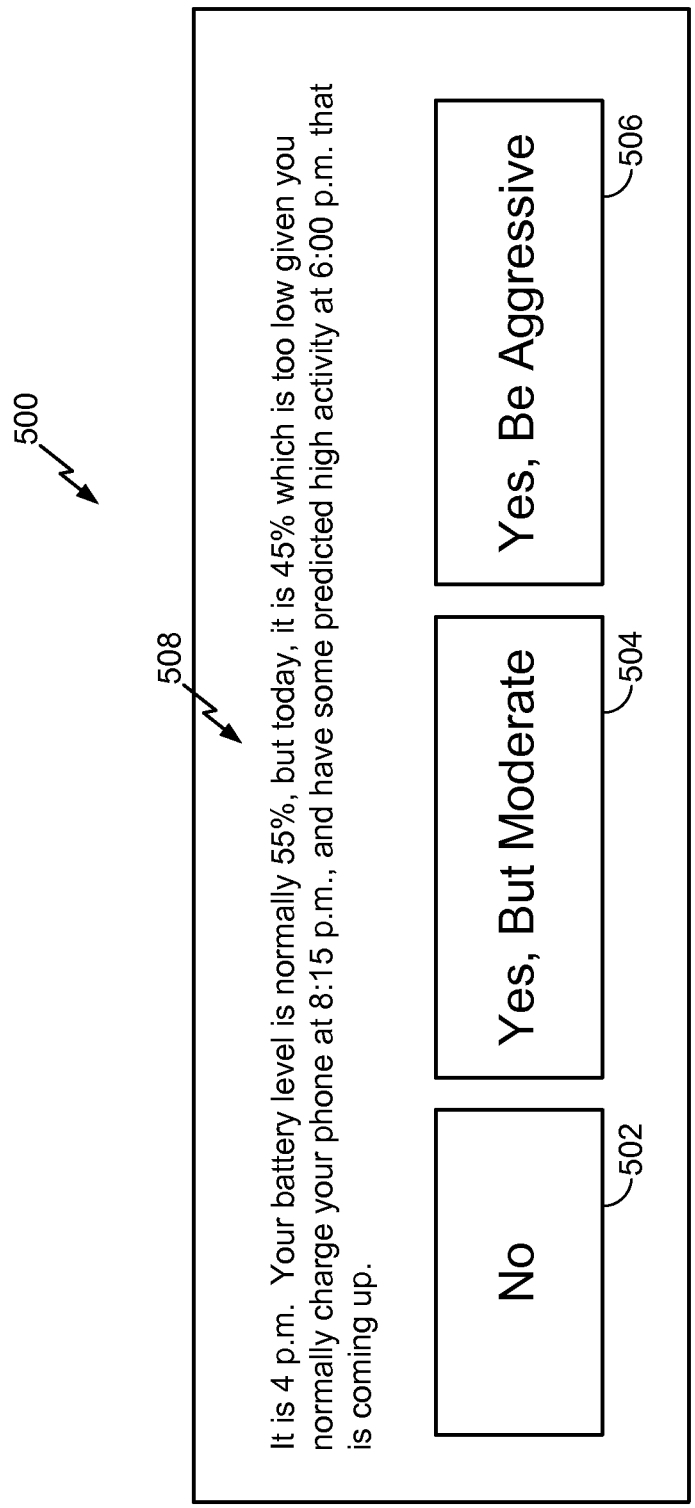
FIG. 5 is a diagram of a first illustrative embodiment of a user interface associated with a system of extending battery life.

Thus, FIG. 4 illustrates that the power profile 400 may be used when comparing the battery charge value of the portable electronic device at the particular time to the threshold battery charge value associated with the particular time in order to determine whether to prompt a user to select a power save mode (see FIG. 5).

Referring to FIG. 5, a particular embodiment of a user interface that is displayed in response to determining that a battery charge value at a particular time does not satisfy a threshold battery charge value is illustrated and generally designated 500. For example, the power profile 400 of FIG. 4 may be used to determine whether to display the user interface 500 of FIG. 5. In the embodiment illustrated in FIG. 5, the user may be prompted to select a power save mode via a display that includes multiple selectable power save modes (e.g., the windowing display modes of FIGS. 1 and 2, and the touchscreen gestures mode of FIG. 3). Alternatively, the portable electronic device may automatically enter a power save mode without user input.

The user interface 500 may include a recommendation that the user activate a power saving mode of the portable electronic device. In the embodiment illustrated in FIG. 5, the user interface 500 may enable the user to decline the recommendation to enter a power save mode via a first selectable input 502. In response to the user declining the recommendation via selection of the first selectable input 502, the power save mode is not activated. The user interface 500 may enable the user to accept a recommendation to enter a moderate power save mode via a second selectable input 504. In response to the user accepting the recommendation via selection of the second selectable input 504, portable electronic device may enter the moderate power save mode. The user interface 500 may enable the user to accept a recommendation to enter an aggressive power save mode via a third selectable input 506. In response to the user accepting the recommendation via the third selectable input 506, the portable electronic device may enter the aggressive power save mode. In one embodiment, the windowing display modes of FIGS. 1 and 2 or the touchscreen gestures method of FIG. 3 may be associated with the moderate power save mode, with the aggressive power save mode, or with both the moderate and aggressive power save modes.

To illustrate, the user interface 500 may display a message 508 that informs the user of a low battery charge level compared to a historical power profile (e.g., the power profile 400 of FIG. 4). The user interface 500 may indicate that the battery may run out before a next expected charge time. Alternatively or in addition, an audible alert may be used to notify the user of the low battery charge level.

In a particular illustrative embodiment, when the portable electronic device includes a mobile communication device (e.g., a mobile telephone) and when a user has selected to enter a power save mode, one or more power save operations may be determined at least partially based on wireless signal strength. For example, when the wireless signal strength is high (e.g., four "bars"), a relatively small amount of power may be consumed to download content (e.g., a web page), and the content may be downloaded normally. As another example, when the wireless signal strength is moderate (e.g., three "bars"), text and pictures may be downloaded normally while videos and advertisements may not be downloaded. As a further example, when the wireless signal strength is low (e.g., two "bars" or fewer), text may be downloaded normally while pictures, videos, and advertisements may not be downloaded. As a result, power consumption associated with utilization of a modem may be reduced. In one embodiment, the content that is not downloaded may be indicated to the user (e.g. via an "X" over a location where the content would appear), enabling the user to selectively download the content (e.g., by selecting the "X"). Thus, one or more content items may be selectively downloaded based on wireless signal strength. When the wireless signal strength satisfies a wireless signal strength threshold (e.g., a threshold number of "bars"), one or more content items may be downloaded. When the wireless signal strength does not satisfy the wireless signal strength threshold, the one or more content items may not be downloaded.

Referring to FIG. 6, a particular embodiment of a user interface that may be displayed to notify a user of power consumption of a particular application is illustrated and generally designated 600. The user interface 600 of FIG. 6 may be displayed for a particular application when a moderate or aggressive power save mode has been activated (e.g., in response to the user selecting one of the selectable inputs 504, 506 of FIG. 5).

In the embodiment illustrated in FIG. 6, the user interface 600 may be displayed during utilization of the particular application (e.g., an online poker application). Based on information obtained during the calibration stage, the power consumption associated with the particular application may be used to inform the user of the power consumption rate and to suggest alternative applications that may reduce power consumption in order to extend battery life. Thus, FIG. 6 illustrates that a suggestion to reduce power consumption may include a suggestion to deactivate a first application with a first power consumption level and to activate an alternative application with a reduced power consumption level.

Figure 7:
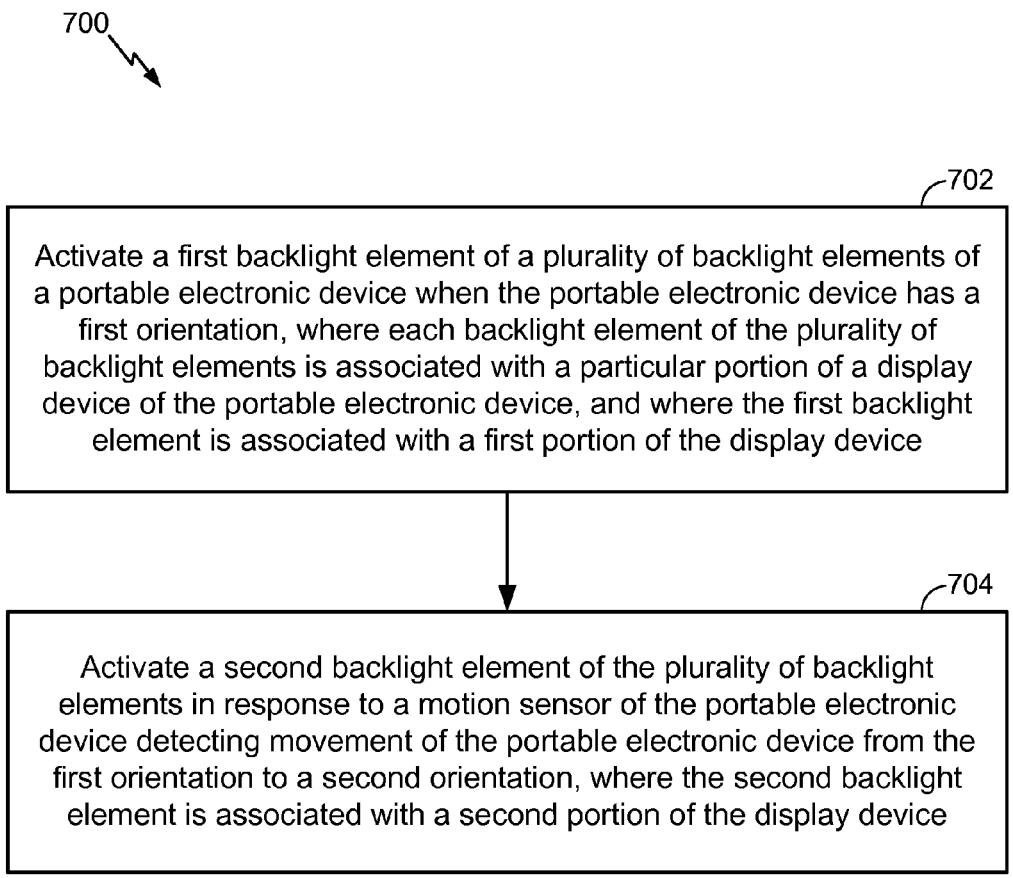
FIG. 7 is a flow chart of a first illustrative embodiment of a method of extending battery life.

Referring to FIG. 7, a first illustrative embodiment of a method of extending battery life is disclosed and generally designated 700. FIG. 7 illustrates that different backlight elements of a portable electronic device may be activated depending on a position or orientation of the portable electronic device in order to provide a user with at least a subset of functionality of the portable electronic device while extending battery life of the portable electronic device.

The method 700 includes activating a first backlight element of a plurality of backlight elements of the portable electronic device when the portable electronic device has a first orientation, at 702. For example, the first backlight element 106 of FIG. 1 may be activated when the portable electronic device 102 has the first orientation 118. As another example, the first backlight element 206 of FIG. 2 may be activated when the portable electronic device 202 has the first orientation 218. Each backlight element of the plurality of backlight elements is associated with a particular portion of a display device of the portable electronic device, and the first backlight element is associated with a first portion of the display device. For example, each of the backlight elements 106-116 of FIG. 1 is associated with a particular portion of the display device 104, and each of the backlight elements 206-216 of FIG. 2 is associated with a particular portion of the display device 204.

The method 700 further includes activating a second backlight element of the plurality of backlight elements in response to a motion sensor of the portable electronic device detecting movement of the portable electronic device from the first orientation to a second orientation, at 704. The second backlight element is associated with a second portion of the display device. For example, the second backlight element 108 of FIG. 1 may be activated in response to the motion sensor 105 of the portable electronic device 102 detecting movement from the first orientation 118 to the second orientation 120. As another example, the second backlight element 208 of FIG. 2 may be activated in response to the motion sensor 205 of the portable electronic device 202 detecting movement from the first orientation 218 to the second orientation 220.

Figure 8:
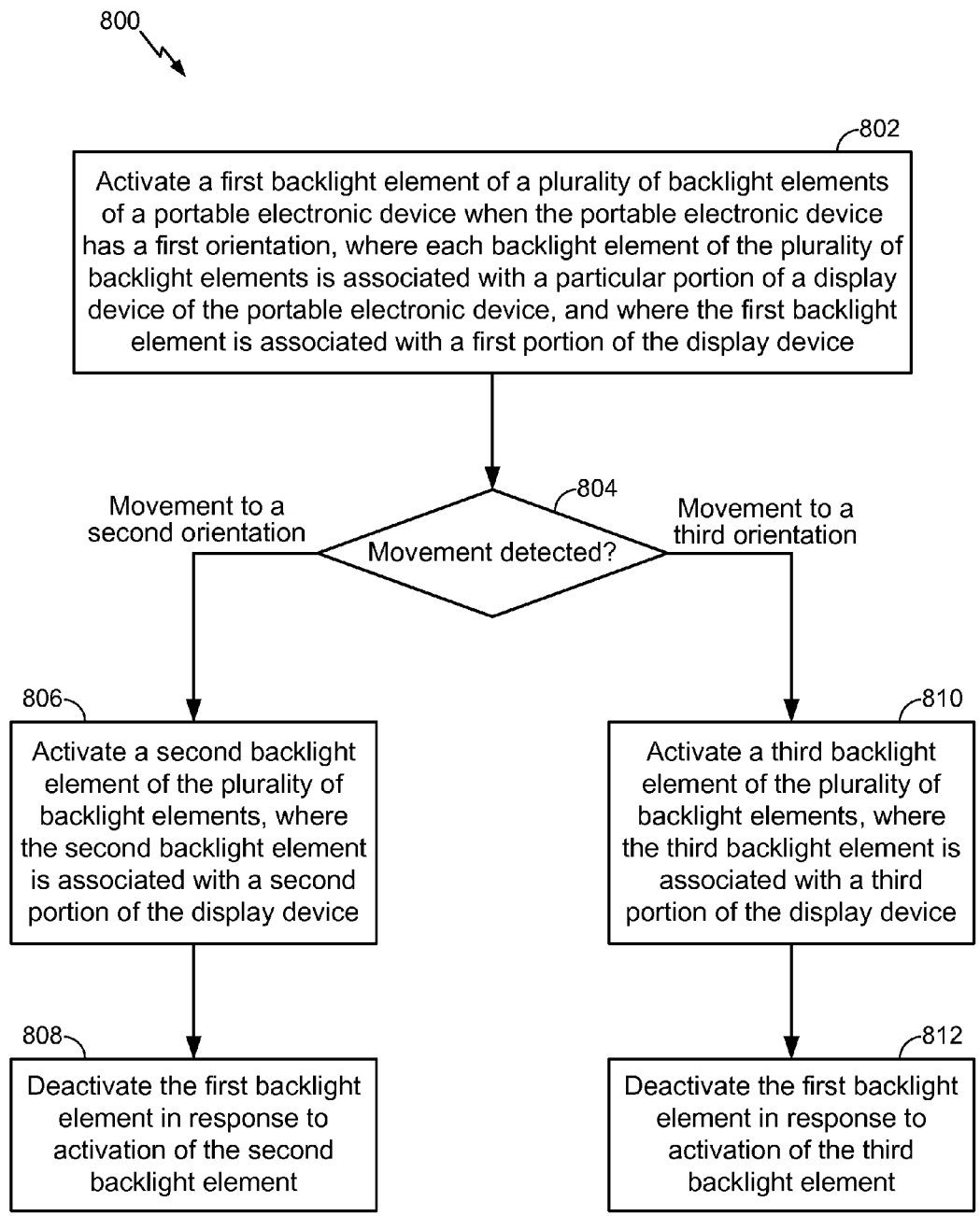
FIG. 8 is a flow chart of a second illustrative embodiment of a method of extending battery life.

Referring to FIG. 8, a second illustrative embodiment of a method of extending battery life is disclosed and generally designated 800. FIG. 8 illustrates that different backlight elements of a portable electronic device may be activated depending on a position or orientation of the portable electronic device in order to provide a user with at least a subset of functionality of the portable electronic device while in a power save mode. Further, activation of one backlight element as a result of the movement may result in deactivation of another backlight element.

The method 800 includes activating a first backlight element of a plurality of backlight elements of a portable electronic device when the portable electronic device has a first orientation, at 802. For example, the first backlight element 106 of FIG. 1 may be activated when the portable electronic device 102 has the first orientation 118. As another example, the first backlight element 206 of FIG. 2 may be activated when the portable electronic device 202 has the first orientation 218. Each backlight element of the plurality of backlight elements is associated with a particular portion of a display device of the portable electronic device, and the first backlight element is associated with a first portion of the display device. For example, each of the backlight elements 106-116 of FIG. 1 is associated with a particular portion of the display device 104, and each of the backlight elements 206-216 of FIG. 2 is associated with a particular portion of the display device 204.

When movement to a second orientation is detected at 804, the method 800 proceeds to 806. In this case, the method 800 includes activating a second backlight element of the plurality of backlight elements, at 806. The second backlight element is associated with a second portion of the display device. In the embodiment illustrated in FIG. 8, the method 800 includes deactivating the first backlight element in response to activation of the second backlight element, at 808. For example, the second backlight element 108 of FIG. 1 may be activated in response to the motion sensor 105 of the portable electronic device 102 detecting movement from the first orientation 118 to the second orientation 120, and the first backlight element 106 may be deactivated. As another example, the second backlight element 208 of FIG. 2 may be activated in response to the motion sensor 205 of the portable electronic device 202 detecting movement from the first orientation 218 to the second orientation 220, and the first backlight element 206 may be deactivated.

When movement to a third orientation is detected at 804, the method 800 proceeds to 810. In this case, the method 800 includes activating a third backlight element of the plurality of backlight elements, at 810. The third backlight element is associated with a third portion of the display device. In the embodiment illustrated in FIG. 8, the method 800 includes deactivating the first backlight element in response to activation of the third backlight element, at 812. As an illustrative example, the fourth backlight element 112 of FIG. 1 may be activated in response to the motion sensor 105 of the portable electronic device 102 detecting movement from the first orientation 118 to a third orientation (not shown), and the first backlight element 106 may be deactivated. In the embodiment illustrated in FIG. 1, the movement may represent a negative change of pitch (i.e., a backward tilt) with respect to the first orientation 118. As another example, the fifth backlight element 214 of FIG. 2 may be activated in response to the motion sensor 205 of the portable electronic device 202 detecting movement from the first orientation 218 to a third orientation (not shown). In the embodiment illustrated in FIG. 2, the movement may represent a different change of roll with respect to the first orientation 118 (e.g., a counter-clockwise rotation about the Z axis 224).

Figure 9:
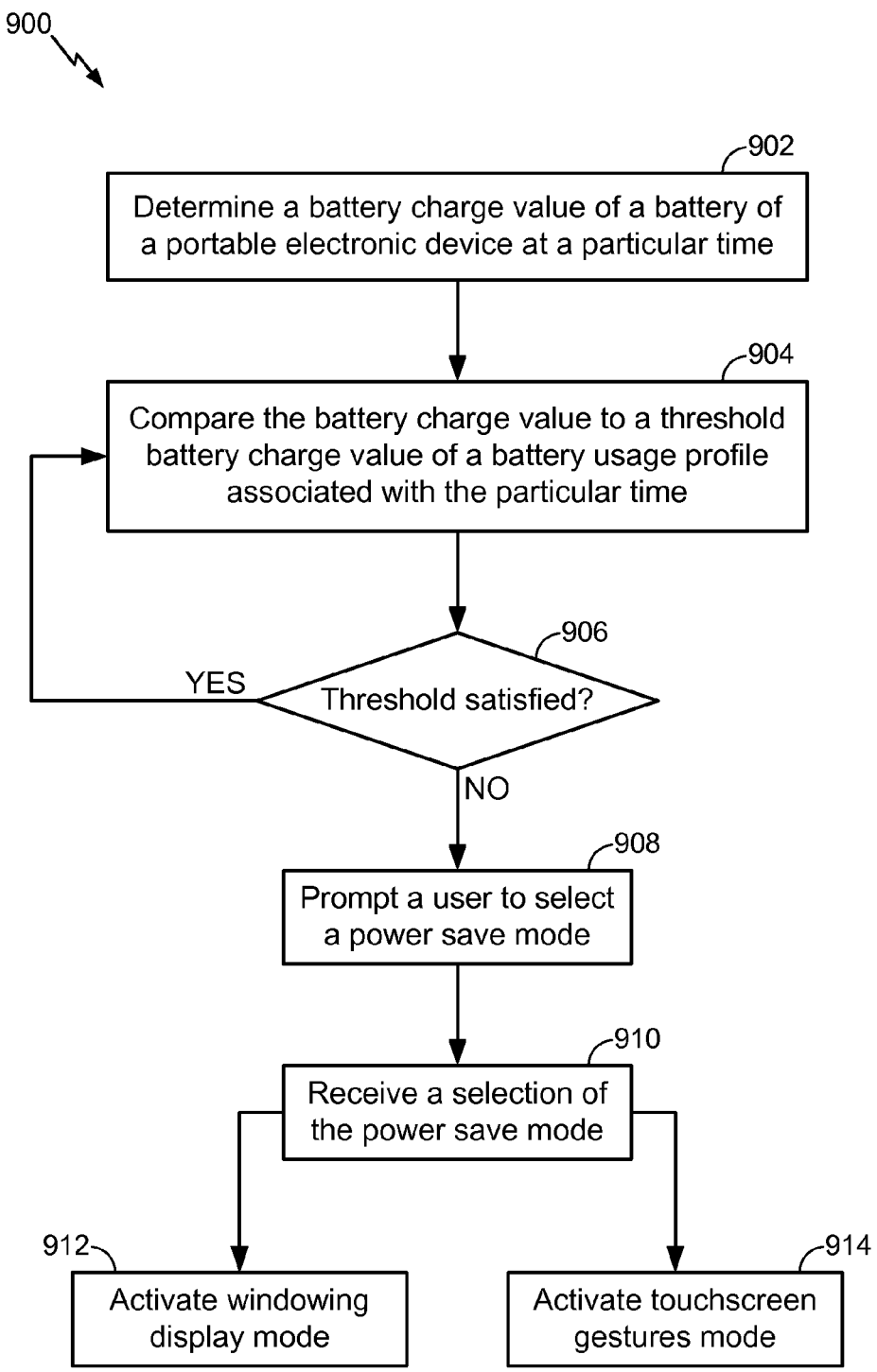
FIG. 9 is a flow chart of a particular illustrative embodiment of a method of extending battery life based on a battery usage profile.

Referring to FIG. 9, a particular illustrative embodiment of a method of extending battery life is disclosed and generally designated 900. FIG. 9 illustrates that a battery usage profile may be utilized to determine whether to prompt a user to select a power save mode.

The method 900 includes determining a battery charge value of a battery of a portable electronic device at a particular time, at 902. The method 900 includes comparing the battery charge value to a threshold battery charge value of a battery usage profile associated with the particular time, at 904. For example, the battery usage profile may be the power profile 400 of FIG. 4, and the threshold battery charge value may be determined based on the second data 404 that represents a threshold battery charge value at the particular time.

The method 900 includes determining whether the battery charge value satisfies the threshold battery charge value, at 906. When the battery charge value satisfies the threshold, the method 900 returns to 904. When the battery charge value does not satisfy the threshold, the method 900 continues to 908, where a user is prompted to select a power save mode. For example, the power save mode may include the windowing display modes of FIGS. 1 and 2 or the touchscreen gestures mode of FIG. 3.

The method 900 may include receiving a selection of the power save mode, at 910. In response to the selection of the power save mode at 910, the method 900 may include activating the windowing display mode of FIG. 1 or the windowing display mode of FIG. 2, at 912. Alternatively, or in addition, in response to the selection of power save mode at 910, the method 900 may include activating the touchscreen gestures mode of FIG. 3, at 914. In alternative embodiments, other power save modes may be activated in response to the selection received at 910.

Figure 10:
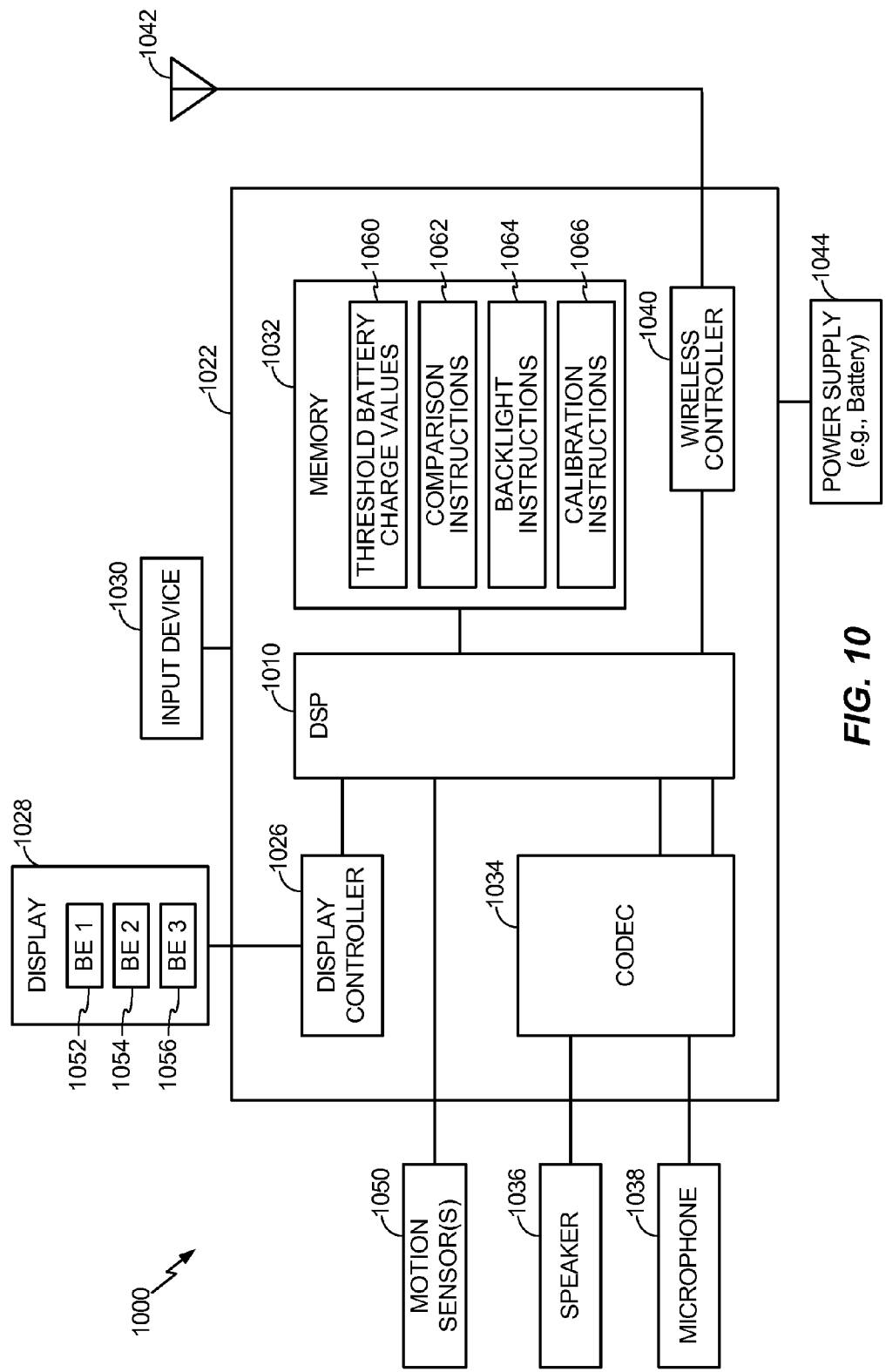
FIG. 10 is a block diagram of a portable electronic device that includes logic to extend a battery life of the portable electronic device.

Referring to FIG. 10, a block diagram of a particular illustrative embodiment of a portable electronic device that includes instructions to extend battery life is depicted and generally designated 1000. In one embodiment, the portable electronic device 1000 of FIG. 10 includes or is included within the portable electronic device 102 of FIG. 1, the portable electronic device 202 of FIG. 2, or the portable electronic device 302 of FIG. 3. Further, all or part of the methods described in FIGS. 7-9 may be performed at the portable electronic device 1000 of FIG. 10. The portable electronic device 1000 includes a processor, such as a digital signal processor (DSP) 1010, coupled to a memory 1032. The memory 1032 may include threshold battery charge values 1060 (e.g., data included in a power profile, such as the power profile 400 of FIG. 4), comparison instructions 1062, backlight instructions 1064, and calibration instructions 1066.

The memory 1032 is a non-transitory tangible computer readable storage medium that stores the threshold battery charge values 1060 and the instructions 1062-1064. The instructions 1062-1066 are executable by the DSP 1010. For example, the comparison instructions 1062 may include instructions to determine a battery charge value of the portable electronic device 1000 at a particular time, to compare the battery charge value to a threshold battery charge value 1060 of a battery usage profile associated with the particular time, and to prompt a user to select a power save mode when the battery charge value does not satisfy the threshold battery charge value 1060. The calibration instructions 1066 may be used to generate the threshold battery charge values 1060 based on power usage data obtained during a calibration stage (as described with respect to FIG. 4).

The backlight instructions 1064 may include instructions to activate a first backlight element ("BE") 1052 of a plurality of backlight elements 1052-1056 of the portable electronic device 1000 when the portable electronic device 1000 has a first orientation. While three backlight elements 1052-1056 are illustrated in FIG. 10, the portable electronic device 1000 may include any number of backlight elements (e.g., six backlight elements as in FIGS. 1 and 2). Each backlight element of the plurality of backlight elements 1052-1056 is associated with a particular portion of a display device 1028. For example, the first backlight element 1052 may be associated with a first portion of the display device 1028. The backlight instructions 1064 may further include instructions to activate a second backlight element 1054 of the plurality of backlight elements 1052-1056 in response to a motion sensor 1050 detecting movement from the first orientation to a second orientation. The second backlight element 1054 is associated with a second portion of the display device 1028. For example, the first backlight element 1052 of FIG. 10 may correspond to the first backlight element 106 of FIG. 1 or the first backlight element 206 of FIG. 2. As another example, the second backlight element 1054 of FIG. 10 may correspond to the second backlight element 108 of FIG. 1 or the second backlight element 208 of FIG. 2.

FIG. 10 also shows a display controller 1026 that is coupled to the digital signal processor 1010 and to the display device 1028. The display controller 1026 performs the function of activating the first backlight element 1052 when the portable electronic device 1000 has a first orientation and activating the second backlight element 1054 in response to detection of movement (i.e., via the motion sensor 1050) from the first orientation to a second orientation. For example, the backlight instructions 1064 may be used to determine the particular backlight element (e.g., the second backlight element 1054, the third backlight element 1056, or both) to activate in response to the movement detected by the motion sensor 1050. As another example, the backlight instructions 1064 may be used to determine whether to deactivate the first backlight element 1052 when other backlight elements are activated.

A coder/decoder (CODEC) 1034 can also be coupled to the digital signal processor 1010. A speaker 1036 and a microphone 1038 can be coupled to the CODEC 1034. FIG. 10 also indicates that a wireless controller 1040 can be coupled to the digital signal processor 1010 and to a wireless antenna 1042. In a particular embodiment, the DSP 1010, the display controller 1026, the memory 1032, the CODEC 1034, and the wireless controller 1040 are included in a system-in-package or system-on-chip device 1022. In a particular embodiment, an input device 1030 and a power supply 1044 (e.g., a battery) are coupled to the system-on-chip device 1022. Moreover, in a particular embodiment, as illustrated in FIG. 10, the display device 1028, the input device 1030, the speaker 1036, the microphone 1038, the wireless antenna 1042, the power supply 1044, and the motion sensor 1050 are external to the system-on-chip device 1022. However, each of the display device 1028, the input device 1030, the speaker 1036, the microphone 1038, the wireless antenna 1042, the power supply 1044, and the motion sensor 1050 can be coupled to a component of the system-on-chip device 1022, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:

activating a first backlight element of a plurality of backlight elements of a portable electronic device while other backlight elements of the plurality of backlight elements are turned off when the portable electronic device has a first orientation, so that a first image portion of an image on a first portion of a display device of the portable electronic device is observable by a user of the portable electronic device and other image portions on other portions of the display device are not observable by the user, wherein each backlight element of the plurality of backlight elements is associated with a particular portion of the display device of the portable electronic device, and wherein the first backlight element is associated with the first portion of the display device;

activating a second backlight element of the plurality of backlight elements while other backlight elements of the plurality of backlight elements are turned off in response to a motion sensor of the portable electronic device detecting movement of the portable electronic device from the first orientation to a second orientation, so that a second image portion of the image on a second portion of the display device of the portable electronic device is observable by the user of the portable electronic device and other image portions on other portions of the display device are not observable by the user, wherein the second backlight element is associated with the second portion of the display device, and wherein the first backlight element remains associated with the first image portion while the second backlight element is activated;

wherein the first image portion is different from the second image portion; and wherein the first image portion and the second image portion are parts of the image presented on the display device.

2. The method of claim 1, further comprising deactivating the first backlight element in response to activation of the second backlight element.

3. The method of claim 2, further comprising activating a third backlight element of the plurality of backlight elements in response to the motion sensor detecting movement of the portable electronic device from the second orientation to a third orientation, wherein the third backlight element is associated with a third portion of the display device.

4. The method of claim 3, further comprising deactivating the second backlight element in response to activation of the third backlight element.

5. The method of claim 1, wherein the movement includes a change in pitch of the portable electronic device.

6. The method of claim 1, wherein the movement includes a change in one of roll and yaw of the portable electronic device.

7. The method of claim 1, wherein the motion sensor includes an accelerometer.

8. The method of claim 1, wherein the motion sensor includes one of a gyroscope and a compass.

9. A portable electronic device, comprising:
a display device;
a plurality of backlight elements, wherein each backlight element of the plurality of backlight elements is associated with a particular portion of the display device;
a motion sensor; and
logic configured to:
activate a first backlight element of the plurality of backlight elements while other backlight elements of the plurality of backlight elements are turned off when the portable electronic device has a first orientation, so that a first image portion on a first portion of the display device of the portable electronic device is observable by a user of the portable electronic device and other image portions on other portions of the display device are not observable by the user, wherein the first backlight element is associated with the first portion of the display device;
activate a second backlight element of the plurality of backlight elements while other backlight elements of the plurality of backlight elements are turned off in response to the motion sensor detecting movement of the portable electronic device from the first orientation to a second orientation, so that a second image portion on a second portion of the display device of the portable electronic device is observable by the user of the portable electronic device and other image portions on other portions of the display device are not observable by the user, wherein the second backlight element is associated with the second portion of the display device, and wherein the first backlight element remains associated with the first image portion while the second backlight element is activated;
wherein the first image portion is different from the second image portion; and
wherein the first image portion and the second image portion are parts of an image presented on the display device.

10. The portable electronic device of claim 9, wherein the logic is further configured to activate a third backlight element of the plurality of backlight elements in response to the motion sensor detecting movement of the portable electronic device from the first orientation to a third orientation, wherein the third backlight element is associated with a third portion of the display device.

11. The portable electronic device of claim 10, wherein the motion sensor includes an accelerometer, wherein the second backlight element is activated in response to the accelerometer detecting a change of pitch in a first direction, and wherein the third backlight element is activated in response to the accelerometer detecting a change of pitch in a second direction.

12. The portable electronic device of claim 9, wherein the logic is further configured to activate all of the plurality of backlight elements in response to the motion sensor detecting a shaking motion.

13. An apparatus, comprising:
means for detecting movement of a portable electronic device;
means for activating a first backlight element of a plurality of backlight elements of a display device while other backlight elements of the plurality of backlight elements are turned off when the portable electronic device has a first orientation, so that a first image portion on a first portion of the display device of the portable electronic device is observable by a user of the portable electronic device and other image portions on other portions of the display device are not observable by the user, wherein each backlight element of the plurality of backlight elements is associated with a particular portion of the display device, and wherein the first backlight element is associated with the first portion of the display device;
means for activating a second backlight element of the plurality of backlight elements while other backlight elements of the plurality of backlight elements are turned off in response to detection of movement of the portable electronic device from the first orientation to a second orientation, so that a second image portion on a second portion of the display device of the portable electronic device is observable by the user of the portable electronic device and other image portions on other portions of the display device are not observable by the user, wherein the second backlight element is associated with the second portion of the display device, and wherein the first backlight element remains associated with the first image portion while the second backlight element is activated;
wherein the first image portion is different from the second image portion; and
wherein the first image portion and the second image portion are parts of an image presented on the display device.

14. The apparatus of claim 13, further comprising means for activating a third backlight element of the plurality of backlight elements in response to detection of movement of the portable electronic device to a third orientation, wherein the third backlight element is associated with a third portion of the display device.

15. The apparatus of claim 13, further comprising means for deactivating the first backlight element when the second backlight element is activated.

16. A non-transitory computer readable medium comprising instructions that, when executed by a processor, cause the processor to:
activate a first backlight element of a plurality of backlight elements of a portable electronic device while other backlight elements of the plurality of backlight elements are turned off when the portable electronic device has a first orientation, so that a first image portion on a first portion of a display device of the portable electronic device is observable by a user of the portable electronic device and other image portions on other portions of the display device are not observable by the user, wherein each backlight element of the plurality of backlight elements is associated with a particular portion of the display device of the portable electronic device, and wherein the first backlight element is associated with the first portion of the display device;

activate a second backlight element of the plurality of backlight elements while other backlight elements of the plurality of backlight elements are turned off in response to the portable electronic device moving from the first orientation to a second orientation, so that a second image portion on a second portion of the display device of the portable electronic device is observable by the user of the portable electronic device and other image portions on other portions of the display device are not observable by the user, wherein the second backlight element is associated with the second portion of the display device, and wherein the first backlight element remains associated with the first image portion while the second backlight element is activated;

wherein the first image portion is different from the second image portion; and wherein the first image portion and the second image portion are parts of an image presented on the display device.

17. The non-transitory computer readable medium of claim 16, further comprising instructions that, when executed by the processor, cause the processor to activate a third backlight element of the plurality of backlight elements in response to the portable electronic device moving to a third orientation, wherein the third backlight element is associated with a third portion of the display device.

18. The non-transitory computer readable medium of claim 16, further comprising instructions that, when executed by the processor, cause the processor to deactivate the first backlight element when the second backlight element is activated.

19. A method, comprising:
determining a battery charge value of a battery of a portable electronic device at a particular time;
comparing the battery charge value determined at the particular time to a threshold battery charge value of a battery usage profile associated with the particular time, wherein the threshold battery charge value varies over time; and
when the battery charge value does not satisfy the threshold battery charge value, prompting a user to select a power save mode,
wherein the power save mode includes a mode that activates a first backlight element of a plurality of backlight elements of the portable electronic device in response to a first orientation of the portable electronic device while other backlight elements of the plurality of backlight elements are turned off, so that a first image portion on a first portion of a display device of the portable electronic device is observable by a user of the portable electronic device and other image portions on other portions of the display device are not observable by the user, wherein the first backlight element is associated with the first portion of the display device of the portable electronic device,
wherein the power save mode includes a mode that activates a second backlight element of a plurality of backlight elements of the portable electronic device in response to a second orientation of the portable electronic device while other backlight elements of the plurality of backlight elements are turned off, so that a second image portion on a second portion of the display device of the portable electronic device is observable by the user of the portable electronic device and other image portions on other portions of the display device are not observable by the user, wherein the second backlight element is associated with the second portion of the display device of the portable electronic device, and wherein the first backlight element remains associated with the first image portion while the second backlight element is activated,
wherein the first image portion is different from the second image portion, and
wherein the first image portion and the second image portion are parts of an image presented on the display device.

20. The method of claim 19, wherein prompting the user to select a power save mode includes initiating display of information indicating that the battery charge value does not satisfy the threshold battery charge value.

21. An apparatus, comprising:
means for determining a battery charge value of a battery of a portable electronic device at a particular time;
means for comparing the battery charge value determined at the particular time to a threshold battery charge value of a battery usage profile associated with the particular time, wherein the threshold battery charge value varies over time; and
means for prompting a user to select a power save mode when the battery charge value does not satisfy the threshold battery charge value,
wherein the power save mode includes a mode that activates a first backlight element of a plurality of backlight elements of the portable electronic device in response to a first orientation of the portable electronic device while other backlight elements of the plurality of backlight elements are turned off, so that a first image portion on a first portion of a display device of the portable electronic device is observable by a user of the portable electronic device and other image portions on other portions of backlight elements are not observable by the user, wherein the first backlight element is associated with the first portion of the display device of the portable electronic device
wherein the power save mode includes a mode that activates a second backlight element of a plurality of backlight elements of the portable electronic device in response to a second orientation of the portable electronic device while other backlight elements of the plurality of backlight elements are turned off, so that a second image portion on a second portion of the display device of the portable electronic device is observable by the user of the portable electronic device and other image portions on other portions of the display device are not observable b the user wherein the second backlight element is associated with the second portion of the display device of the portable electronic device, and wherein the first backlight element remains associated with the first image portion while the second backlight element is activated,
wherein the first image portion is different from the second image portion, and wherein the first image portion and the second image portion are parts of an image presented on the display device.

22. A non-transitory computer readable medium comprising instructions that, when executed by a processor, cause the processor to:

determine a battery charge value of a battery of a portable electronic device at a particular time;

compare the battery charge value determined at the particular time to a threshold battery charge value of a battery usage profile associated with the particular time, wherein the threshold battery charge value varies over time; and prompt a user to select a power save mode when the battery charge value does not satisfy the threshold battery charge value, wherein the power save mode includes a mode that activates a first backlight element of a plurality of backlight elements of the portable electronic device in response to a first orientation of the portable electronic device while other backlight elements of the plurality of backlight elements are turned off, so that a first image portion on a first portion of a display device of the portable electronic device is observable by a user of the portable electronic device and other image portions on other portions of the display device are not observable by the user, wherein the first backlight element is associated with the first portion of the display device of the portable electronic device, wherein the power save mode includes a mode that activates a second backlight element of a plurality of backlight elements of the portable electronic device in response to a second orientation of the portable electronic device while other backlight elements of the plurality of backlight elements are turned off, so that a second image portion on a second portion of the display device of the portable electronic device is observable by the user of the portable electronic device and other image portions on other portions of the display device are not observable by the user, wherein the second backlight element is associated with the second portion of the display device of the portable electronic device, and wherein the first backlight element remains associated with the first image portion while the second backlight element is activated, wherein the first image portion is different from the second image portion, and wherein the first image portion and the second image portion are parts of an image presented on the display device.

* * * * *